United States Patent
Zoeller et al.

[19]

[11] Patent Number: 5,897,777
[45] Date of Patent: Apr. 27, 1999

[54] WASTE WATER TREATMENT SYSTEM

[75] Inventors: Kenneth E. Zoeller, Louisville; Matthew E. Byers, Lawrenceburg, both of Ky.

[73] Assignee: Zoeller Co., Louisville, Ky.

[21] Appl. No.: 08/943,799

[22] Filed: Oct. 3, 1997

[51] Int. Cl.[6] ................................................ C02F 3/06
[52] U.S. Cl. .................... 210/602; 210/605; 210/617; 210/747; 210/150; 210/170; 210/195.1; 210/253; 210/532.2; 405/44
[58] Field of Search ..................... 210/602, 605, 210/617, 621, 747, 150, 151, 170, 194, 195.1, 253, 257.1, 259, 220, 532.2, 266, 291; 405/43, 44

[56] References Cited

U.S. PATENT DOCUMENTS

| | | | |
|---|---|---|---|
| 584,886 | 6/1897 | Mead | 405/43 |
| 3,429,806 | 2/1969 | Carter et al. | 210/621 |
| 3,770,623 | 11/1973 | Seidel | 210/170 |
| 3,894,355 | 7/1975 | Carothers | 210/602 |
| 3,957,642 | 5/1976 | Oldham et al. | 210/194 |
| 4,100,073 | 7/1978 | Hopcroft | 210/170 |
| 4,218,328 | 8/1980 | Niimi et al. | 210/150 |
| 4,333,837 | 6/1982 | Plosz et al. | 210/602 |
| 4,415,450 | 11/1983 | Wolverton | 210/151 |
| 4,824,572 | 4/1989 | Scott | 210/170 |
| 4,892,658 | 1/1990 | Martin et al. | 210/170 |
| 4,904,386 | 2/1990 | Kickuth | 210/747 |
| 4,995,969 | 2/1991 | La Vigne | 210/602 |
| 4,997,568 | 3/1991 | Vandervelde et al. | 210/150 |
| 5,073,257 | 12/1991 | Higa | 210/170 |
| 5,078,882 | 1/1992 | Northrop | 210/602 |
| 5,156,741 | 10/1992 | Morrison et al. | 210/170 |
| 5,174,897 | 12/1992 | Wengrzynek | 210/170 |
| 5,273,653 | 12/1993 | Kickuth | 210/747 |
| 5,427,679 | 6/1995 | Daniels | 210/532.2 |
| 5,437,786 | 8/1995 | Horsley et al. | 210/170 |
| 5,549,817 | 8/1996 | Horsley et al. | 210/170 |
| 5,637,218 | 6/1997 | Kickuth | 210/602 |

FOREIGN PATENT DOCUMENTS 300015  5/1992  Germany.

*Primary Examiner*—Christopher Upton
*Attorney, Agent, or Firm*—Scott R. Cox

[57] ABSTRACT

Disclosed is a waste water treatment system which includes a water impervious container, a uniform effluent distribution system for distributing effluent in a uniform manner throughout the container, material fill which is placed within the container, an effluent introduction system for introducing the effluent into the material filled container and an outflow mechanism which permits treated effluent to flow out of the waste water treatment system. Also disclosed is a waste water treatment cell system containing a plurality of individual cells for the treatment of the effluent and a system for dumping substantially all of the filtered effluent from the waste water distribution system. Also disclosed is a process for the treatment of waste water using the waste water treatment system.

45 Claims, 12 Drawing Sheets

WASTE WATER TREATMENT SYSTEM

This invention relates to waste water treatment systems and particularly to a constructed wetland system for the treatment of effluent, particularly residential waste water treatment.

BACKGROUND OF INVENTION

The treatment of waste water is a significant problem, especially for residential developments which are not connected to community sewer systems. In these situations, waste water is conventionally treated by introducing it into a septic tank where it is initially treated. Outflow from the septic tank is then distributed among lateral fields maintained in the ground. The effectiveness of a septic system depends on many factors including the size of the lot on which the residence is located, the amount of waste water that is introduced into the system on a daily basis and the quality of the soil in which the lateral fields of the septic system are placed. Even if a residential septic system is effective in treating effluents, it sometimes contaminates ground water.

One of the newer methods for treating waste water is the constructed wetland system as discussed, for example, in U.S. Pat. No. 5,174,897. In this system, the effluent flows into a sediment basin (2) and then into a level lip spreader (3) which is designed to spread the flow uniformly across a primary grass filter (4). One difficulty encountered with this type of constructed wetland system is that effluent introduced into the system is not uniformly distributed throughout the system, but rather is input into the system only into a narrow section of the system, i.e., the level lip spreader (3).

Another system for the treatment of municipal waste water located below ground is disclosed by U.S. Pat. No. 5,156,741. This large system utilizes a recirculation system tied to turf grass to recirculate the treated water back into the system after initial treatment via a municipal treatment plant. This system also discloses a series of pipes used for the disbursement of the waste water through the ground for treatment, as shown in FIG. 1. This system requires a generally dry portion of ground to be present above the operative portion of the system used for the treatment of the waste water.

Another apparatus for treating household effluent is disclosed in U.S. Pat. No. 4,824,572. In this system, effluent flows from a septic tank or a series of septic tanks into a treatment bed. The treatment bed includes several layers of gravel and a layer of topsoil into which reeds are planted for treating the effluent. A perforated header pipe distributes the incoming effluent across the head of the bed.

Other systems for the treatment of waste water using microorganisms and plants are disclosed, for example, in U.S. Pat. Nos. 4,415,450, 3,770,623, 5,073,257, 4,995,969 and 4,333,837.

In addition, a system for the treatment of storm water runoff is disclosed in U.S. Pat. Nos. 5,549,817 and 5,437,786.

Constructed wetland systems have begun to be utilized for the treatment of effluent, particularly household effluent. Many of these wetland systems currently in use still have significant deficiencies, including an inability to uniformly distribute the effluent throughout the wetland system, a difficulty in retaining the effluent in the wetland system for a sufficient period of time to adequately treat and filter the effluent, complications and expenses associated with the installation of conventional constructed wetland systems, and difficulty in maintenance and monitoring of conventional constructed wetland cells so that they will adequately treat and filter effluent introduced into these systems. The design of the invention disclosed within this specification addresses these problems.

Accordingly, it is an aspect of this invention to disclose an improved waste water treatment system.

It is a further aspect of this invention to disclose an improved waste water treatment system which is easy to install and maintain.

It is a further aspect of this invention to disclose a waste water treatment system that can be utilized with a conventional residential septic system.

It is a further aspect of this invention to disclose a waste water treatment system wherein the effluent is uniformly distributed throughout the system for efficient treatment.

It is a still further aspect of this invention to disclose a waste water treatment system utilizing a constructed wetland cell, wherein the effluent introduced within the constructed wetland cell is retained within that cell for a sufficient period of time to adequately treat the effluent.

It is a still further aspect of this invention to disclose a waste water treatment system comprising at least a pair of alternating constructed wetland cells, wherein effluent is introduced into only one of those cells for a sufficient period of time to treat the effluent prior to introducing additional effluent into an alternative cell.

It is a still further aspect of this invention to disclose a waste water treatment system utilizing a dump valve system whereby substantially all of the treated and filtered effluent contained within the system is removed from the system at one time.

It is a still further aspect of this invention to disclose a recirculation system wherein filtered effluent from a waste water treatment system is recirculated back into the waste water treatment system for further treatment prior to final discharge from the waste water treatment system.

It is a still further aspect of this invention to disclose a waste water treatment system utilizing a septic system and a constructed wetland system in combination, wherein the septic tank utilizes a pump to pump predetermined quantities of effluent into the constructed wetland system.

It is a still further aspect of this invention to disclose a waste water treatment system utilizing a septic system and a constructed wetland system in combination wherein the septic system contains a pump and a filter to prefilter the effluent prior to introduction into the constructed wetland system.

It is a still further aspect of this invention to disclose a process for the treatment of waste water utilizing a constructed wetland system.

These and other aspects of the invention can be obtained by the disclosed design of the waste water treatment system for the treatment of effluent and the process for the treatment of effluent utilizing the disclosed waste water treatment system.

SUMMARY OF INVENTION

The present invention discloses a waste water treatment system which includes a water impervious container, a uniform effluent distribution system for distributing effluent generally in a uniform manner throughout the container, material fill which fill is placed within the container, an effluent introduction system for introducing effluent into the material filled container and an outflow mechanism which permits treated effluent from the system to flow out of the waste water treatment system. In addition, in a preferred embodiment, the invention discloses a waste water treatment system as above described and additionally containing a dump valve system such that when this dump valve system is opened, substantially all of the filtered effluent flows out of the system in a continuous operation. In a further preferred embodiment, the instant invention also includes a recirculation system for recirculating the treated effluent back into the container.

In a further preferred embodiment, the invention also includes a waste water treatment system utilizing at least a pair of waste water treatment cells and an alternating distribution system for alternatingly distributing effluent between the individual waste water treatment cells, wherein the effluent is generally introduced only into one cell at a time and remains in that cell for a predetermined period of time. In a further preferred embodiment, the invention also includes a filtering system for filtering the effluent prior to introduction into the waste water treatment system.

The invention further includes a process for filtering effluent utilizing the waste water treatment system, as above discussed.

DETAILED DESCRIPTION OF THE PREFERRED EMBODIMENT

Figure 1:
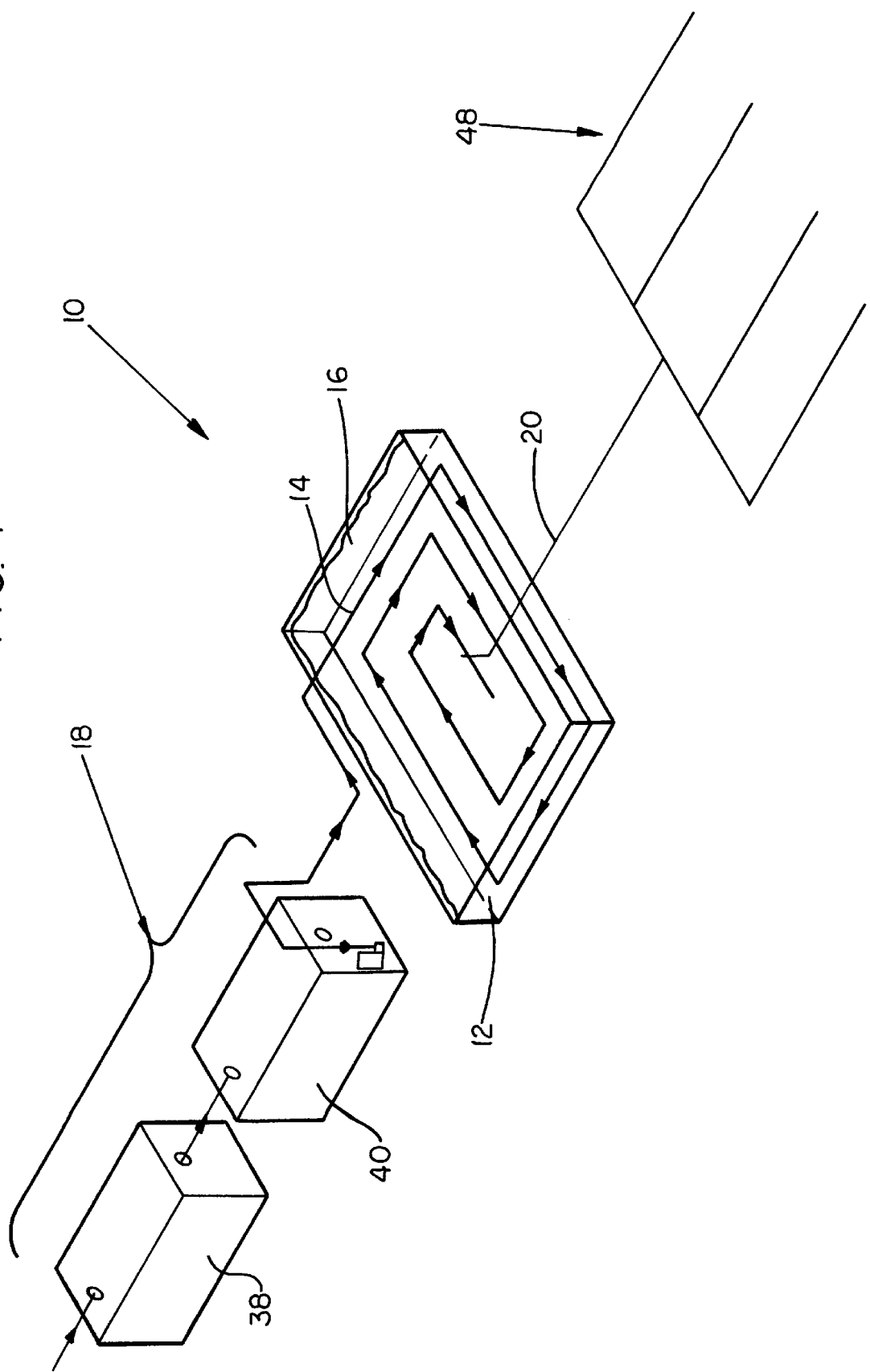
FIG. 1 is a schematic drawing disclosing a conventional septic tank system and the waste water treatment system of the invention, along with a lateral field.

The waste water treatment system (10) of the present invention as shown in FIG. 1 is generally comprised of a water impervious container (12), an effluent distribution system (14) present in the container (12) for distributing effluent throughout the container (12), material fill (16), which fill is placed within the container (12), an effluent introduction system (18) for introducing the effluent into the material filled container (12), and an outflow mechanism (20) which permits treated effluent to flow out of the waste water treatment system (10).

Figure 2:
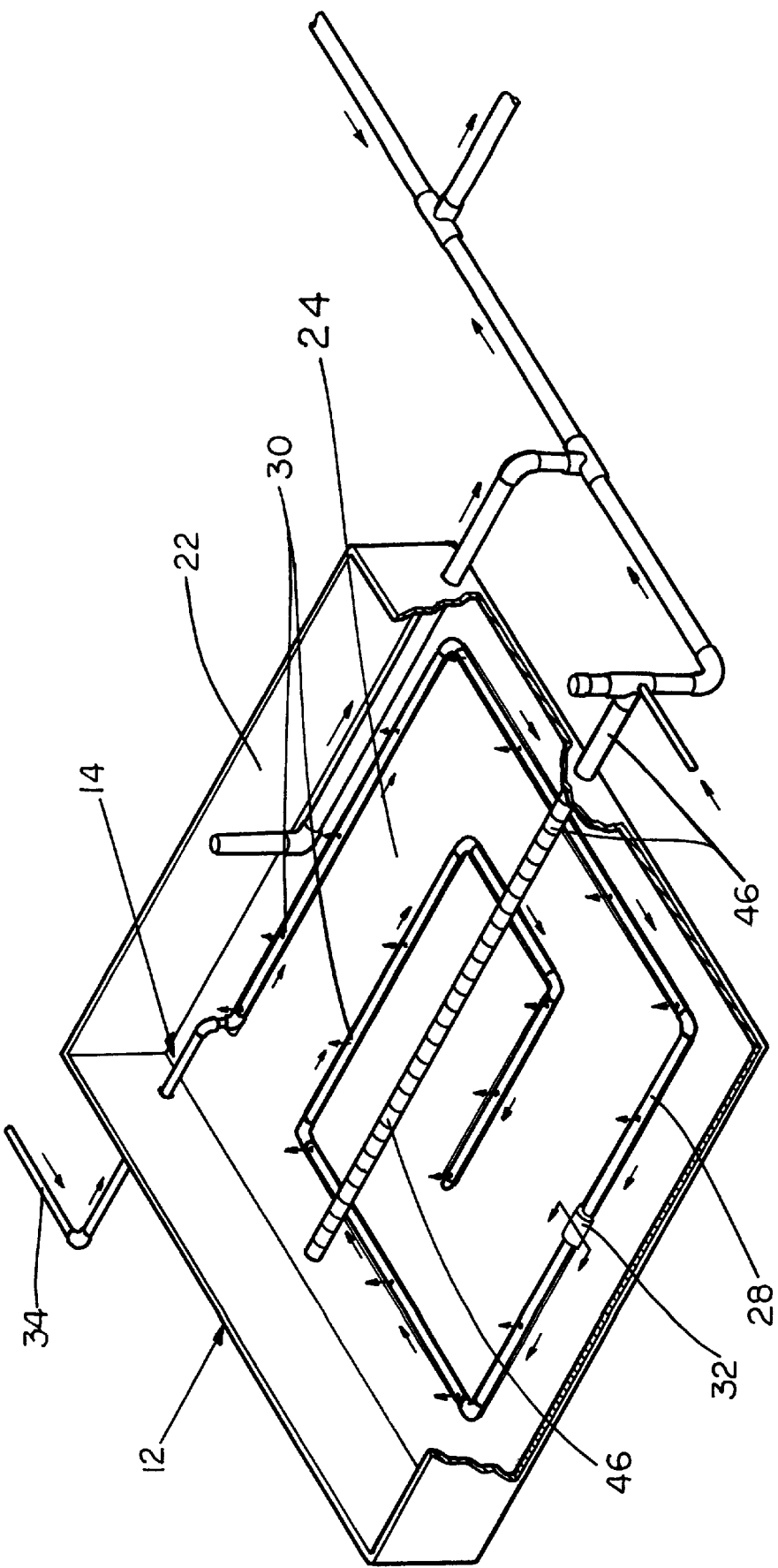
FIG. 2 shows the uniform effluent distribution system which is incorporated into the container.
Figure 3:
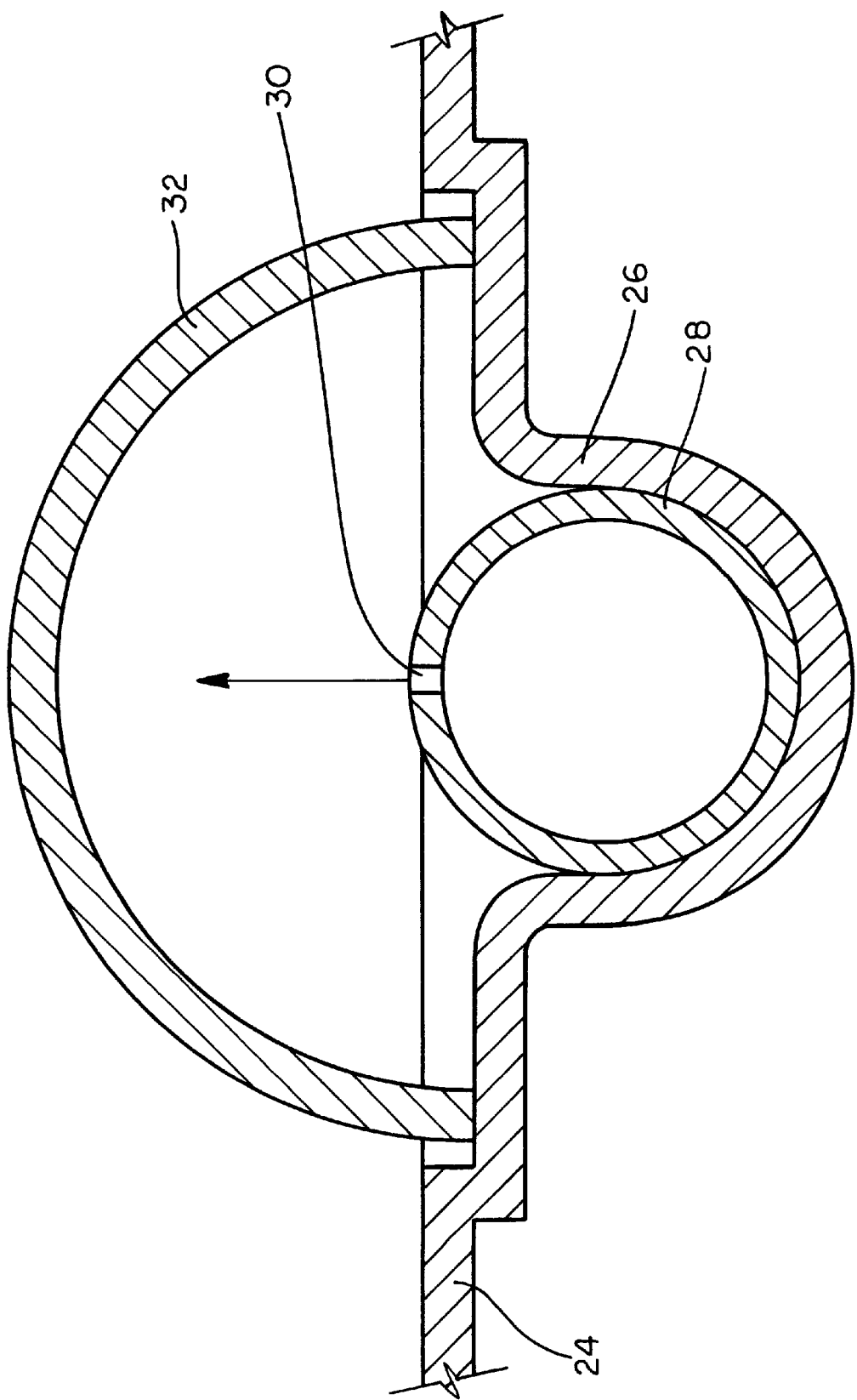
FIG. 3 discloses a side view of a section of pipe from the uniform effluent distribution system of FIG. 2 placed within a groove in the container with a protective cover over that section of the pipe.

The water impervious container (12) is constructed of conventional materials which can be installed into the ground and which will prevent fluids placed within the container (12) from flowing out of the container (12), except through the designed outflow mechanism (20). Preferably, this water impervious container (12) as shown in FIG. 2 contains side walls (22) and a bottom (24) and is constructed of a material which is structurally rigid. The side walls (22) and bottom (24) of the container preferably are structurally rigid so the container (12) will not only retain its shape on installation into the ground, but will prevent effluent present within the container (12) from seeping out of the container through either the side walls (22) or bottom (24) of the container (12). In one preferred embodiment, the bottom (24) of the water impervious container contains a series of grooves (26) as shown in FIG. 3 into which the effluent distribution system (14) is incorporated. This series of grooves (26) will be further discussed when the effluent distribution system (10) is discussed.

The container (12) is preferably constructed of structurally rigid material, such as heavy duty polyethylene, polypropylene, or polyvinylchloride with a thickness of at least about 0.25 inch (0.6 cm). For ease of transportation, the system may be constructed in two or more separate sections which can then be joined at the work site for installation using conventional joining materials.

The overall size of the container (12) can be any size that is adequate to treat all, or substantially all, of the effluent generated by the source for the effluent. For example, in a conventional residential situation, in one preferred embodiment, the container (12) is approximately 8 to 20 feet in length and width, with a depth of at least about 1 foot, preferably at least about 1½ feet.

Connected to the container (12) is the effluent distribution system (14) for distributing effluent. One of the problems with conventional constructed wetland cells is that effluent is normally introduced either within the system in a pipe or across the front of the system into a level lip spreader, for example, as shown in U.S. Pat. No. 5,174,897. These systems, sometimes called point source introduction systems, can cause damage to plants and other organic material located proximal to the point source for introduction of the effluent. They also fail to guarantee uniform distribution of the effluent throughout the system.

To overcome this problem, the present invention preferably contains a uniform effluent distribution system (14) for distributing effluent generally in a uniform manner throughout the container (12) as shown in FIG. 2. In one preferred embodiment, this uniform effluent distribution system (14) is a single pipe system (28) which enters the container (12)

through the front edge of the container (12) and passes into and around the container (12), preferably near or on the bottom (24) of the container (12) as shown in FIG. 2. In a further preferred embodiment, the pipe system (28) is placed within the grooves (26) preformed in the bottom (24) of the container (12) as shown in FIG. 3. In a preferred embodiment a cover (32) is placed over the pipe system (28) to provide space for the discharge of the effluent from the pipe system (28) as is shown in FIGS. 2 and 3. This pipe system (28) may be secured within the grooves (26) of the container prior to the container's installation into the ground or it may be installed into the container (12) after the container (12) is already secured within the ground.

In order to distribute the effluent uniformly throughout the container (12), the pipe system (28) can be formed into various patterns. For example, in one preferred embodiment, the pipe system (28) is placed within the container (12) in a serpentine shape, as is shown in FIG. 2.

The pipe system (28) utilized for the effluent distribution system preferably is designed to permit the effluent entering the pipe system (28) to flow in a generally uniformly manner throughout the material fill (16) of the waste water treatment system (10). Uniform distribution can be achieved by modifying the design of the pipe system (28), such as by increasing the number of openings (30) in the pipe system (28), or by increasing the size of the openings (30) in the pipe system (28), or other well-known, conventional processes for producing a generally uniform flow through a pipe system (28).

After the effluent distribution system (14) is installed into the container (12), material fill (16) is then placed within the container (12) as shown in FIG. 1. The types of products that are utilized as material fill (16) for this system (10) are conventional in the industry. For example in one preferred embodiment, gravel of various sizes is first placed within the container (12) to create spaces between individual pieces of gravel to permit flow of effluent through the system (10). In a preferred embodiment larger gravel is first placed in the bottom of the container and finer gravel is placed near the top of the container. Other types of materials can also be introduced into the container as material fill to assist in the distribution of the effluent and the treatment of the effluent while it is contained within the container. Plants may also be introduced into the material fill (16) but are not mandatory. If plants are introduced into the container (12), the types of plants used depend upon the geographic location of the waste water treatment system (10). The plants should have the ability to grow a root system adequate to penetrate the material fill. The plants should be water loving plants, generally emergent forbasious species and may include, but are not limited to, rushes, cattails or other such related plants including, specifically, *canna spp., scirpus spp., iris spp., juncus spp.* and *typha spp.*

Secured to the inlet portion (34) of the effluent distribution system (14), is the system (18) for the introduction of effluent into the system. The different types of effluent introduction systems utilized with the treatment system (10) are conventional and include a conventional septic tank system or a discharge from a primary waste water treatment system (not shown). In one preferred embodiment, the source of the effluent is a conventional septic tank system, utilizing a septic tank (38) and a pump tank (40) as shown in FIG. 1. In this conventional waste water system, effluent is introduced from the source, such as a residence, into the septic tank (38) where it is acted on by anaerobically bacteria. The effluent from this septic tank (38) is then transferred, generally by gravity to a pump tank (40).

Effluent from the pump tank (40) is then pumped into the waste water treatment system (10) of the present invention. The pumping mechanism from the pump tank is controlled by conventional components such as timers, switches and magnetic relays in a control panel, such as those sold by Zoeller Company.

Figure 5:
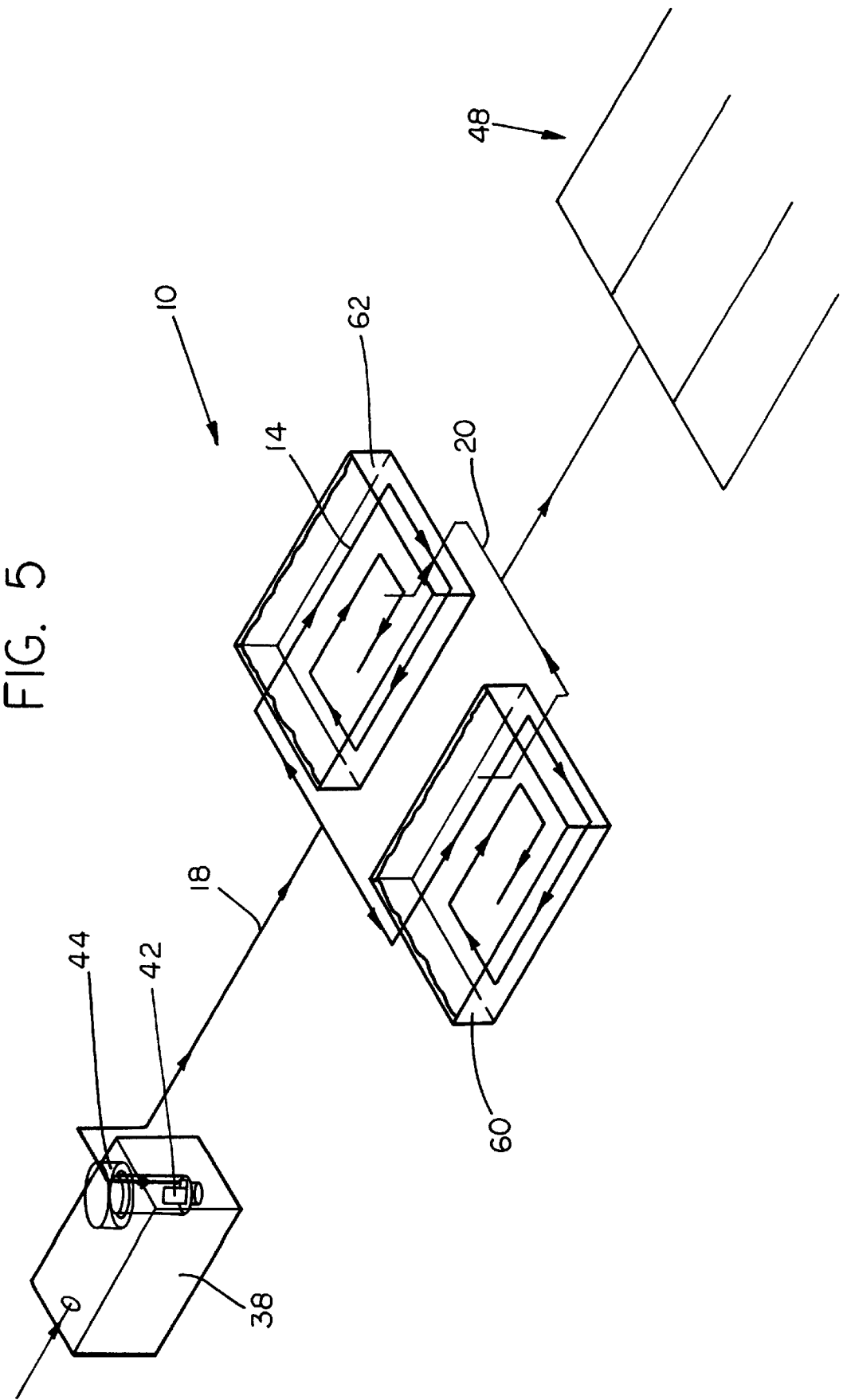
FIG. 5 is a schematic drawing similar to that shown in FIG. 4, except the pump tank is removed from the system and a prefilter is introduced into the septic tank for filtering the effluent prior to introduction into the waste water treatment system.

In an alternative embodiment, the pump tank (40) is eliminated from the septic system and the effluent is pumped directly from the septic tank (38) into the waste water treatment system (10) as shown in FIG. 5. In a preferred embodiment, the septic tank (38) also includes a pump (42) which pumps a predetermined quantity of effluent into the effluent distribution system (14) of the waste water treatment system (10). In a further preferred embodiment, a filter system (44) is also present within the septic tank (38), such that the effluent to be introduced into the waste water treatment system (10) is first filtered prior to its introduction into the waste water treatment system (10).

In a further preferred embodiment as shown in FIG. 5, the effluent introduction system (18) includes a septic tank system (36) which utilizes both a pump (42) for pumping a predetermined quantity of effluent into the waste water treatment system and a filter system (44) for filtering the effluent prior to pumping it into the waste water treatment system (10). The pumping process is controlled by conventional components such as timers, switches and magnetic relay in a control panel such as those sold by Zoeller Company.

Once the effluent is introduced into the waste water treatment system (10), it passes through the pipe system (28) of the effluent distribution system (14) to be uniformly distributed throughout the container (12). The process whereby the effluent is treated within the waste water treatment system (10) is conventional, and has been discussed, for example, in U.S. Pat. No. 4,415,450. The waste water treatment system (10) uses a combination of anaerobic, facilitated and aerobic microorganisms along with the roots of the plants to filter and treat the effluent and to remove undesirable organisms and minerals from the effluent. In addition, complex organic contaminants are converted to carbon dioxide, methane and simple organic material. by the process of the waste water treatment system. Odorous volatile sulfides are removed by the plants or oxidized and assimilated by the aerobic microorganisms near the surface of the waste water treatment system. The combination of the microorganisms and plants also permits the removal of a number of possible metal impurities from the effluent.

The waste water treatment system (10) also contains an outflow mechanism (20), which permits treated effluent to pass out of the waste water treatment system (10). In a preferred embodiment, this overflow mechanism (20) is an outflow piping system (46) as shown in FIG. 2 located near the top surface of the material fill (16) which is placed within the container. The effluent is introduced near the bottom (24) of the container (12) through the effluent introduction system (18) and passes upwardly as a result of the hydrodynamic pressures caused by the introduction of additional effluent into the system. As the effluent passes up through the material fill (16) contained within the container (12), it is acted on by aerobic and anaerobic microorganisms as discussed above. The roots of the plants present in the container (12) also act on the effluent to treat them and break them down prior to its passage out through the outflow mechanism (20). The preferred outflow mechanism (20) is a passive outflow piping system (46). This outflow piping system (46) captures filtered effluent which has risen to its level and allows that fluid to pass out of the waste water treatment system (10). This filtered effluent then passes through piping for conventional disposal, for example, in a lateral field (48) as shown in FIG. 1.

Figure 6:
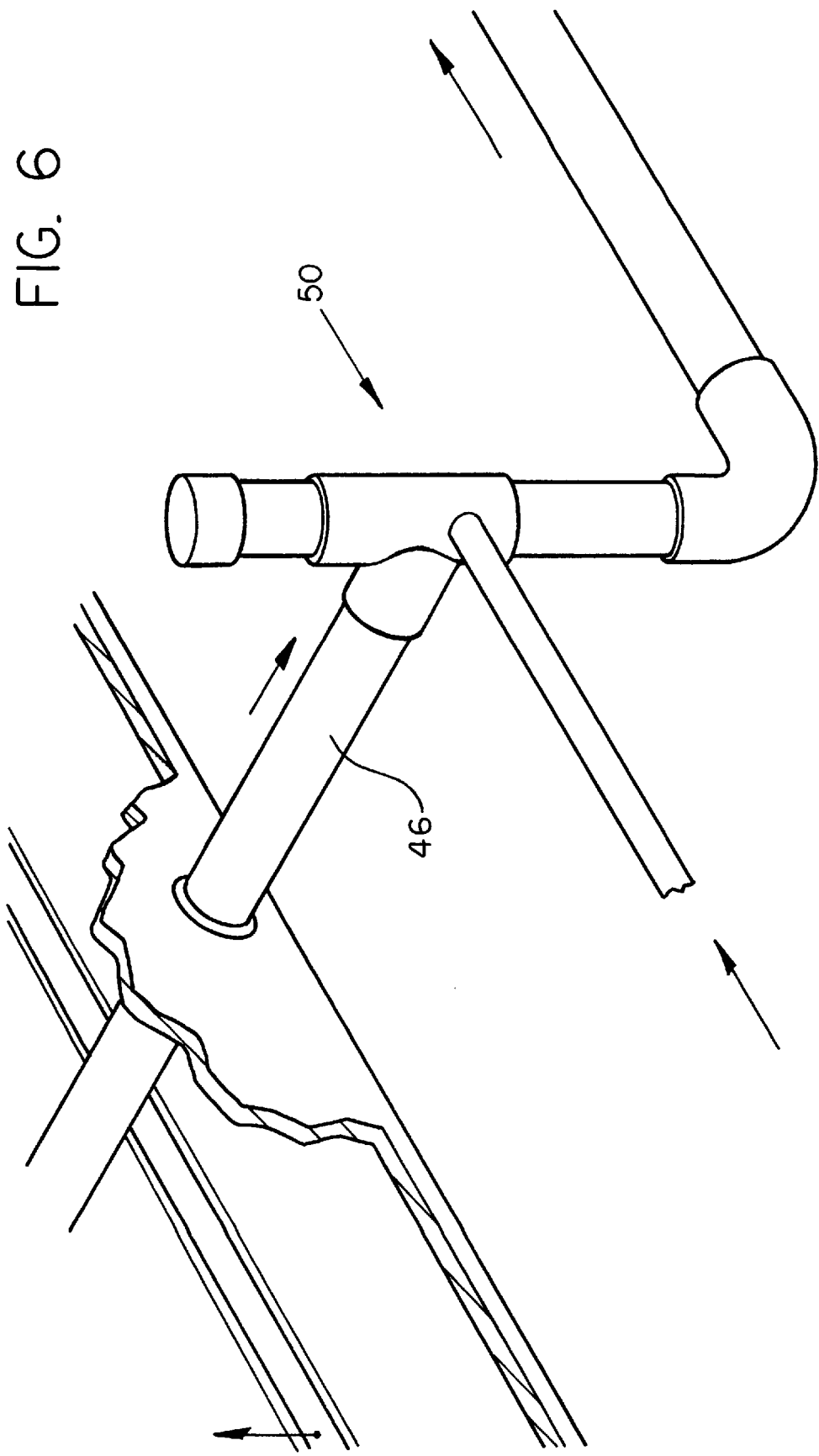
FIG. 6 discloses the dump valve system utilized with the waste water treatment system.

An additional component preferably secured to the outflow mechanism, is a dump valve system (50) as shown in FIG. 6. The dump valve system (50) is preferably located outside the container in connection to a drain pipe secured within the container. Alternatively, the dump valve can be secured within the container by conventional piping. As stated above, the filtered effluent is introduced near the bottom (24) of the container (12) and percolates up through the material fill (16) where it is acted on anaerobically and aerobically. This movement of the effluent generally takes a considerable period of time, at least about 3 hours, and may take as long as about 24 hours depending on the method of introduction of the effluent, such as intermittent as in large volume cases. In addition, the size of the container (12) should be coordinated with the amount of fill material placed within the container (12) so that under normal circumstances the effluent remains in the container (12) for at least one hour, and preferably from about three to about 48 hours.

Figure 4:
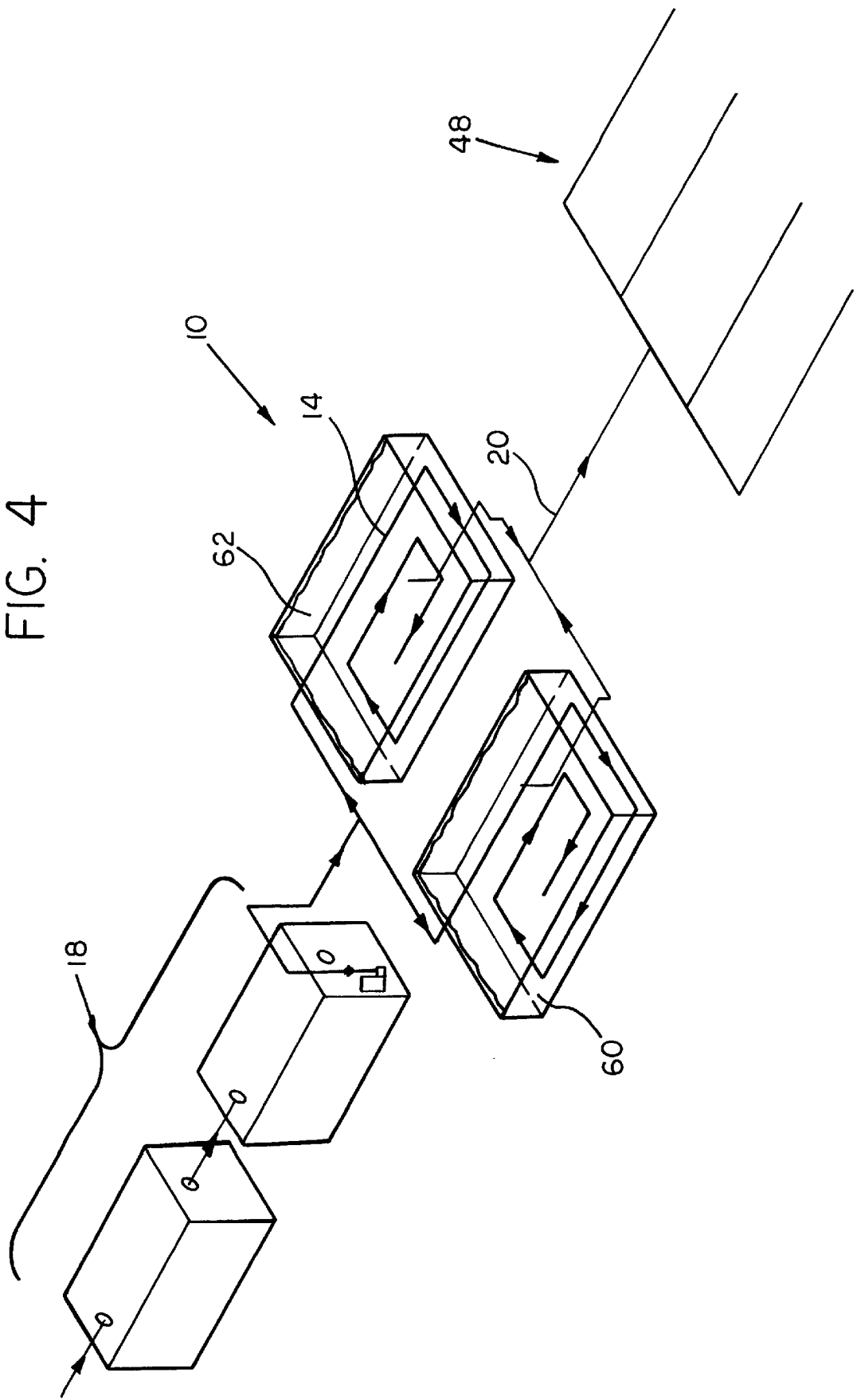
FIG. 4 is a schematic drawing similar to that shown in FIG. 1 except a pair of waste water treatment system cells are utilized.

In conventional systems, the only method of outflow of filtered effluent was through a conventional overflow mechanism as shown in FIGS. 1 and 4. The dump valve system (50) as shown in FIG. 6 of the present invention dumps substantially all of the treated effluent present in the container (12) at one time. The discharge of substantially all of the filtered effluent from the container (12) in a single procedure also assists in drawing air containing oxygen back into the material fill (16). As the liquid vacates the spaces between the pieces of material fill (16) present in the container (12), air is drawn from the outside into the material fill (16) to fill these spaces. This results in oxygenation of the system (10) which assists in the aerobic treatment of the effluent within the container. This is a significantly different procedure than utilized with conventional waste water treatment systems which merely draw off the treated effluent which reaches the level of the outflow mechanism. Thus, during the operation, a significant quantity of effluent is introduced into the waste water treatment system and remains within that system for a significant period of time. Because of the unique design of the waste water treatment of the present invention, an actual residence time for the effluent within the container of at least about three hours and preferably 24 hours is achieved. After this actual residence time is achieved, the dump valve system (50) is opened to allow significantly all of the treated effluent present in the system to be discharged, emptying the container and filling voids in the fill material with air and oxygen. The dump valve itself may be a conventional valve which permits significantly all the effluent contained within the container to be discharged from the container, generally in a continuous flow. One method is with a conventional solenoid valve.

Figure 7:
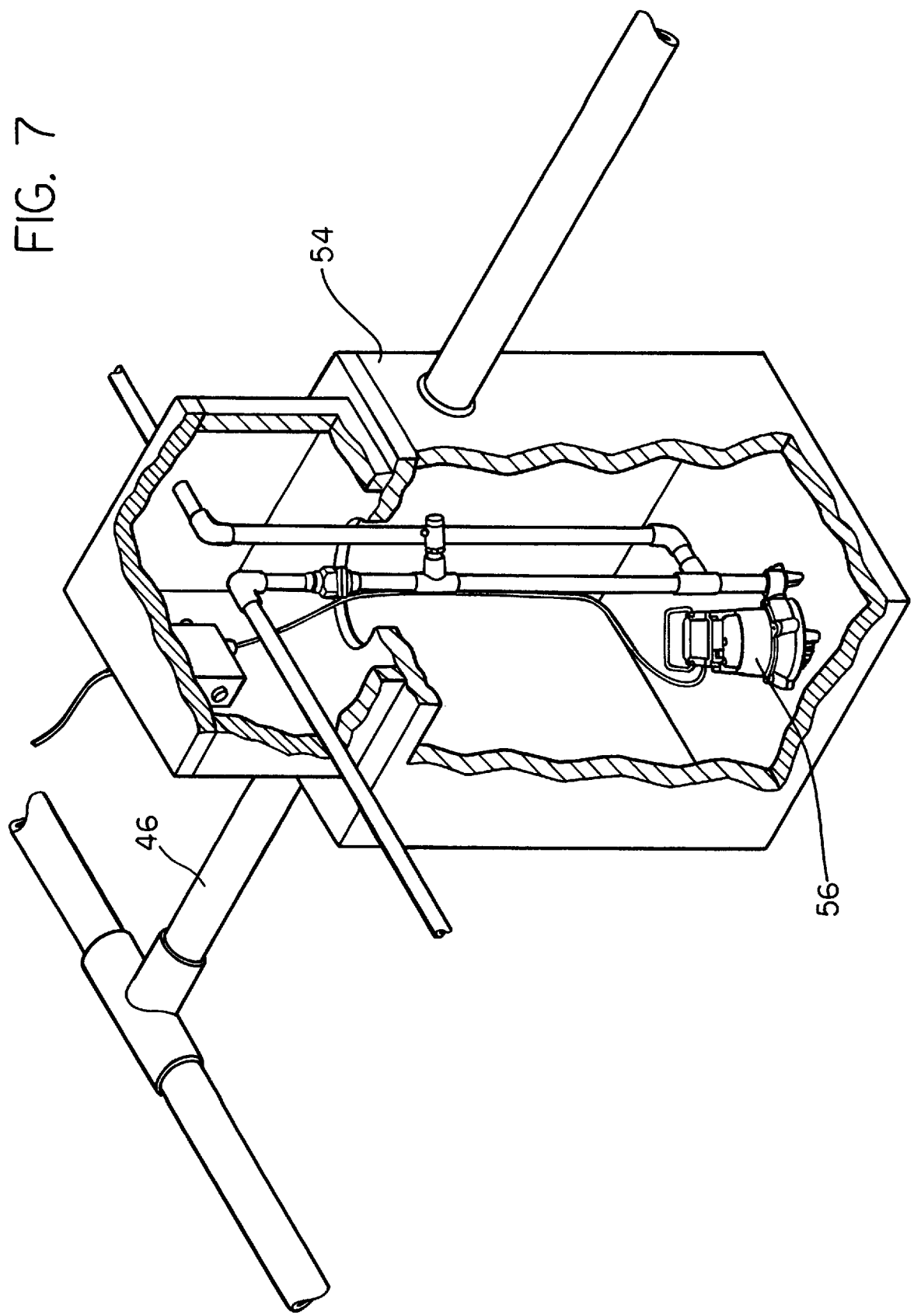
FIG. 7 shows the effluent discharge tank with an electrical pump for recirculation of the treated effluent back into the waste water treatment system.

This dump valve system (50) may pass the treated effluent directly to a conventional water disposal/treatment system, for example, into a lateral field (48). However, in a preferred embodiment as shown in FIG. 7, it is passed into an effluent discharge tank (54) for storage. In a further preferred embodiment, the treated effluent contained within this tank (54) is pumped back into the waste water treatment system (10) through the effluent distribution system (14) for further treatment within the container (12). Thus, a conventional pump (56) is preferably enclosed in this effluent discharge tank (54) to recirculate the already treated effluent back through the effluent distribution system (14) into the waste water treatment system (10) for further treatment as shown in FIG. 11.

The control mechanism for this pump (56) and the control mechanism for the dump valve system (50) are conventional, containing conventional devices such as timers, relay valves, switches and control panels such as those sold by Zoeller Company. Because of natural evaporation of liquids during normal operation of the waste water treatment system (10), the ultimate quantity of treated effluent which actually passes to the disposal system, such as the lateral field (48), is significantly reduced by this additional treatment. In fact, recirculation will increase the quality of the effluent to a degree such that the actual size of the receiving lateral field may be reduced. In a preferred embodiment, the control system (not shown) is incorporated into the retreatment or recirculation system to control the quantity of the filtered effluent that passes from the effluent discharge tank (54) back into the waste water treatment system (10). This control system may include conventional components such as timers, relays in combination with one another and relays which control the recirculation so as not to have the dump valve open when recirculation or dosing occurs.

While a single waste water treatment system cell can be used, in a preferred embodiment, a plurality of waste water treatment cells are utilized with the system. For example, as shown in FIGS. 4, 5, 8–11, a pair (60, 62) of waste water treatment cells either in parallel or in series are utilized. Obviously, three or more cells can also be utilized, although in a preferred embodiment a pair of cells should be sufficient for the treatment of waste water from a conventional residence, such as a three bedroom house.

Figure 8:
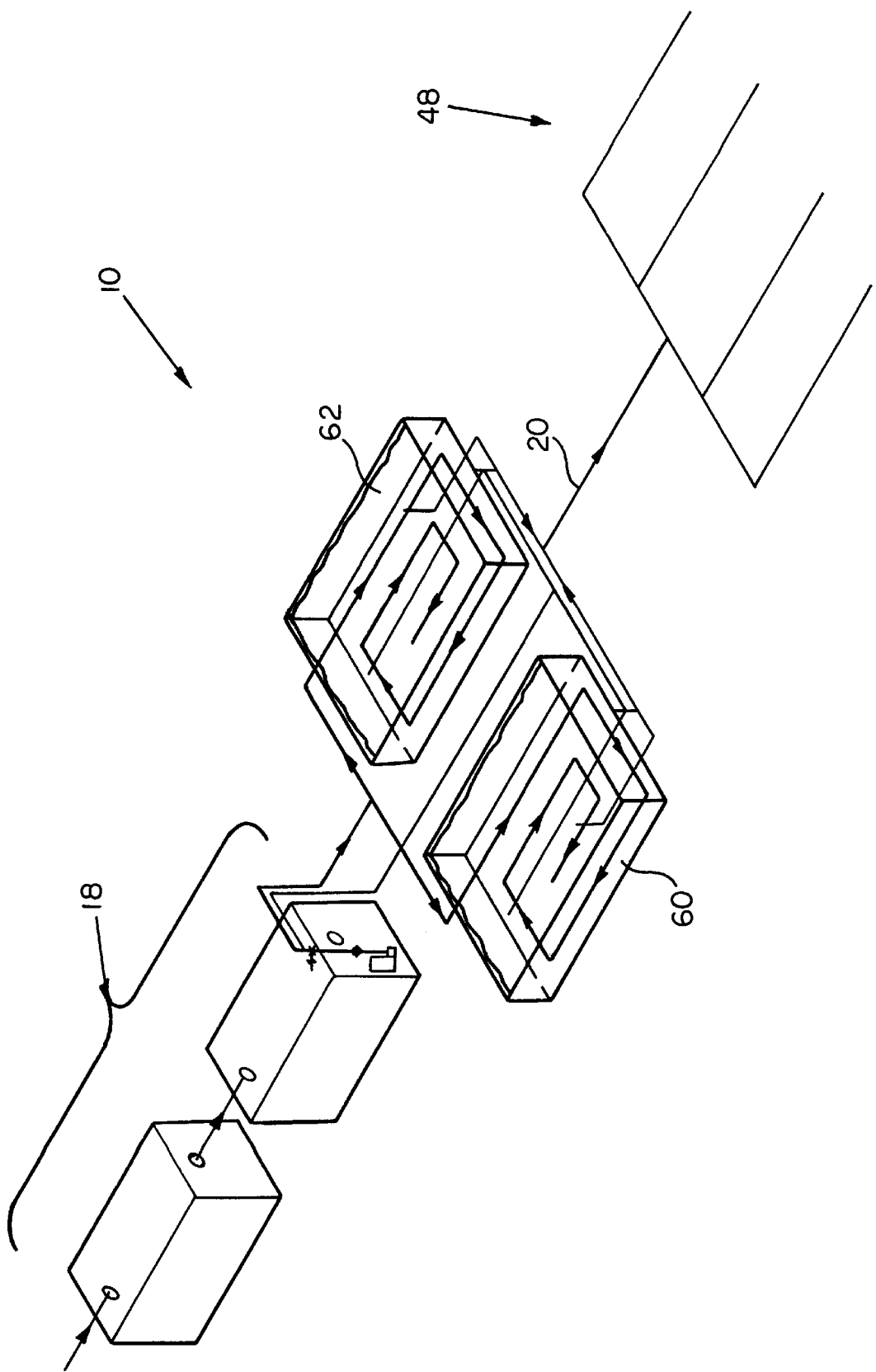
FIG. 8 is a schematic drawing showing a system similar to that shown in FIG. 4 except a dump valve system is incorporated into each of the waste water treatment system cells.
Figure 9:
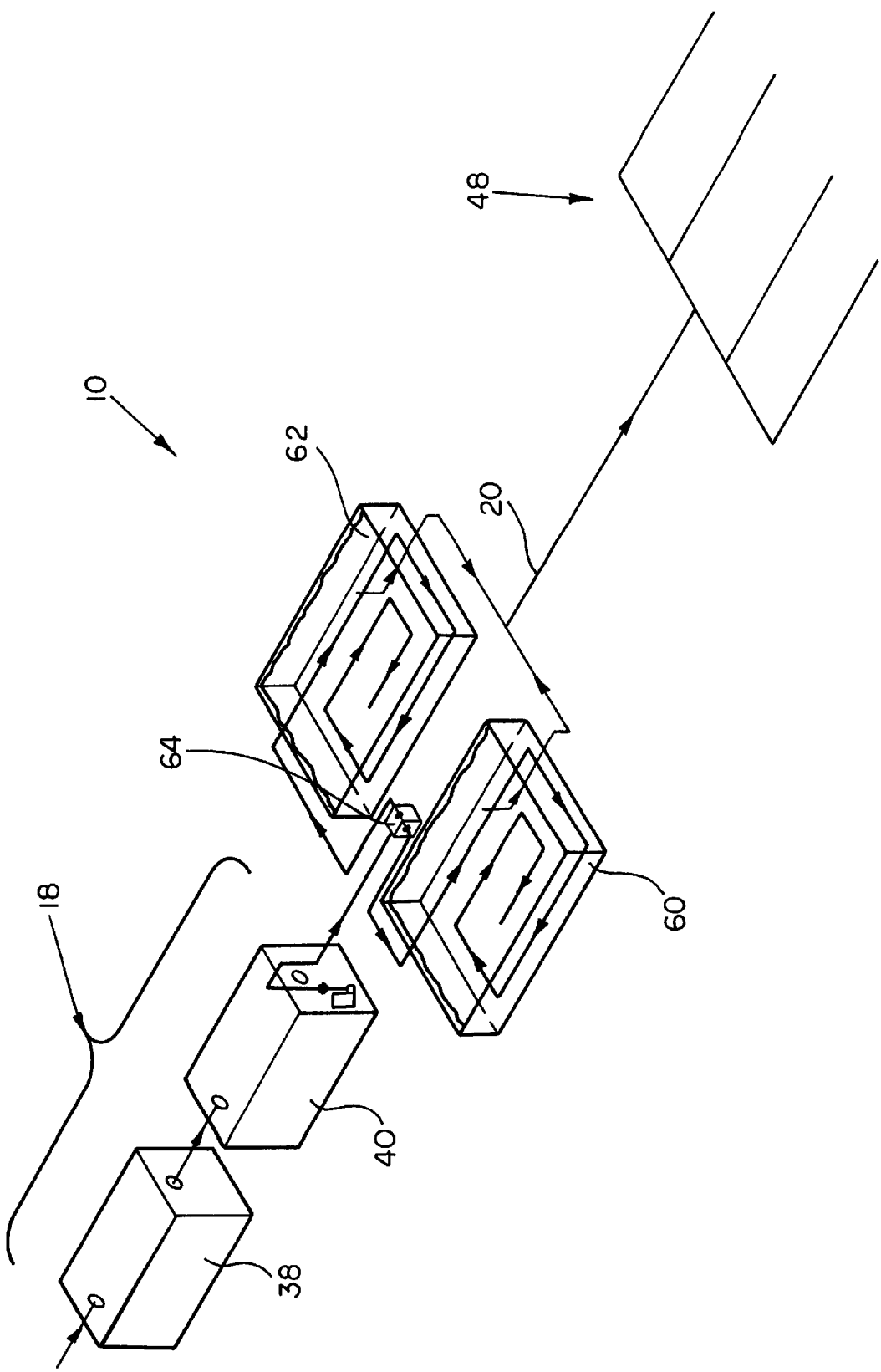
FIG. 9 is a schematic drawing showing a system similar in design to that of FIG. 4 except an alternating valve is introduced into the system to transfer effluent from the septic system alternatively between the water treatment system cells.
Figure 10:
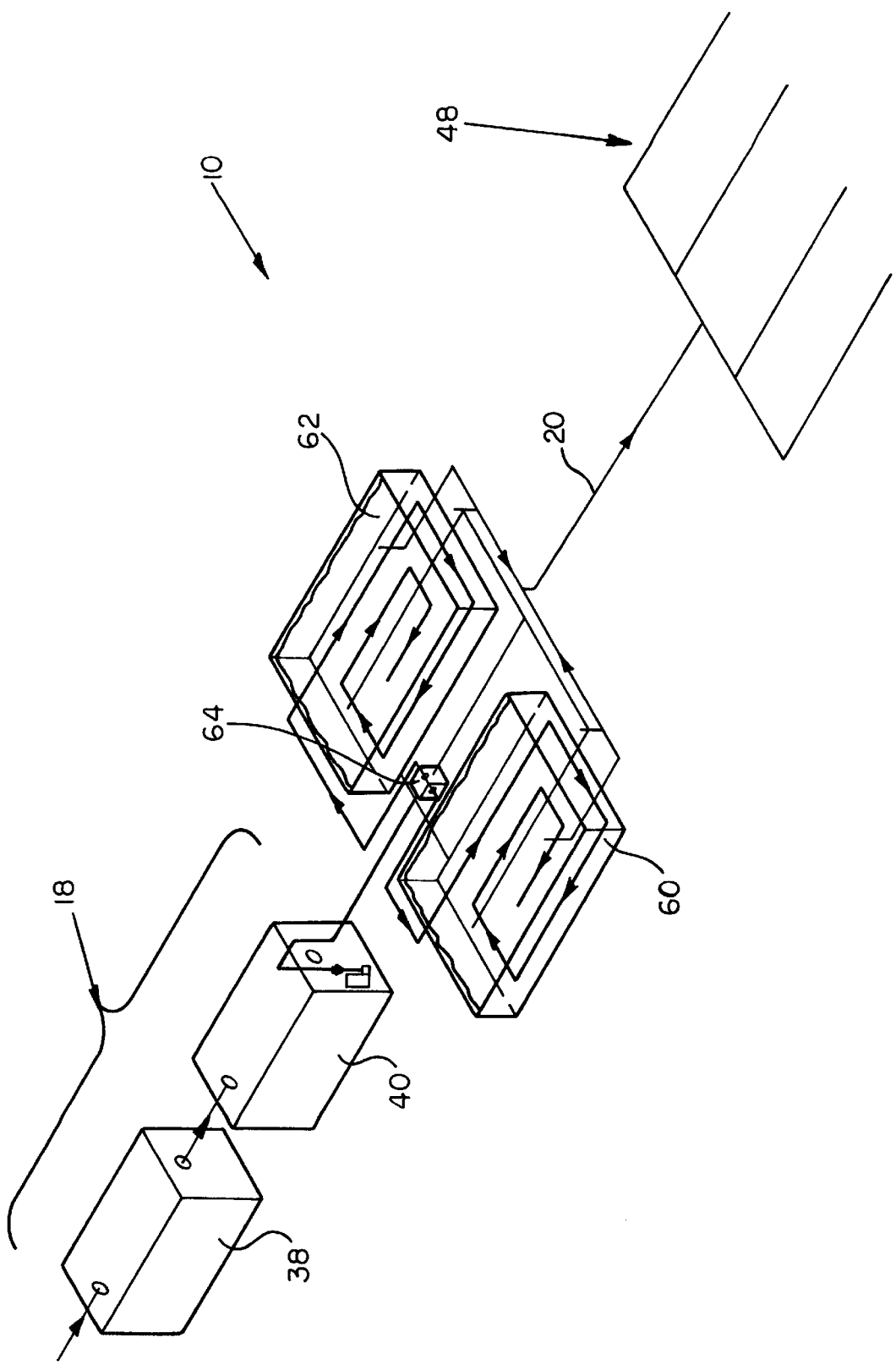
FIG. 10 is a schematic drawing similar to that shown in FIG. 9 except a pair of dump valves are incorporated, one into each of the waste water treatment cells at the location for the outflow of treated effluent.
Figure 11:
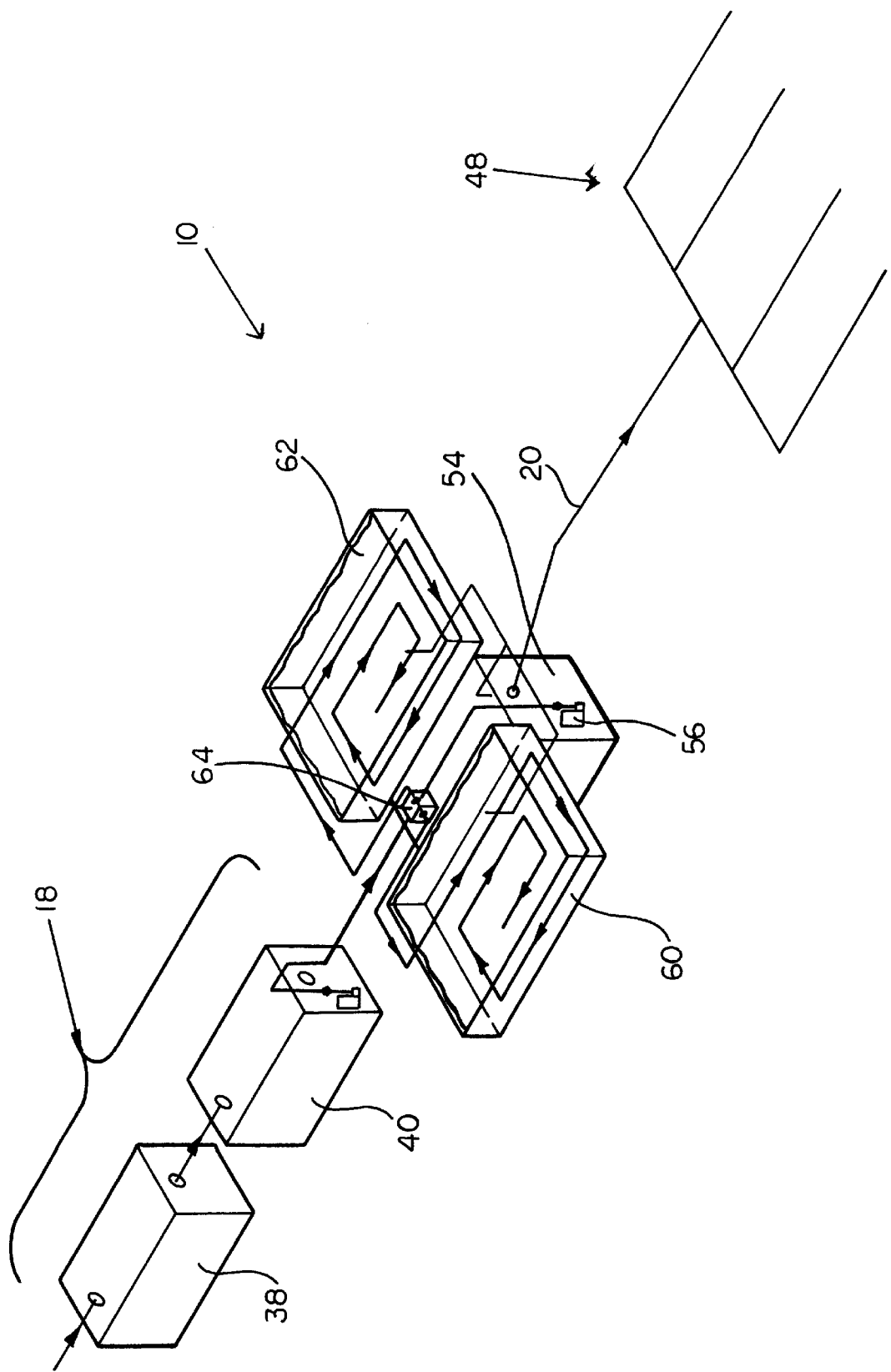
FIG. 11 is a schematic drawing similar to that of FIG. 10, except an effluent discharge tank and a recirculation pump for recirculating treated effluent back into the waste water treatment system for further treatment are incorporated into the system.

When two cells (60, 62) are utilized, the effluent initially passes into either of the cells for treatment as shown in FIGS. 4, 5 and 8, however, in a preferred embodiment, an alternating distribution system (64) as shown in FIGS. 9, 10 and 11 is utilized such that all effluent from the source will pass only into one of the cells (60) at a time for a predetermined period of time and after that period of time, the effluent will then only pass into the second cell (62) for treatment for a predetermined period of time. By this alternating distribution system (64), effluent introduced into either cell will have a significant real residence time within that cell. In certain prior systems, the effluent continuously flows into the waste water treatment system cell and constantly flows out of the outflow mechanism of that cell often seeking the path of least resistance and sometimes short circuiting effective treatment. Depending on the amount of effluent introduced into the cell within a given period of time, that effluent may remain within that cell (60, 62) for only a limited period of time, thus reducing the period of time during which the effluent may be acted on by aerobic and anaerobic microorganisms as well as the plants that are an element of the treatment system. Preferably, the effluent should remain in one of the cells for at least about three hours and preferably from about 24 to about 48 hours. The real residence time of the effluent within the cell can be controlled through conventional control systems which are incorporated within the system such as conventional components such as timers, relays and switches present in a control panel.

Figure 12:
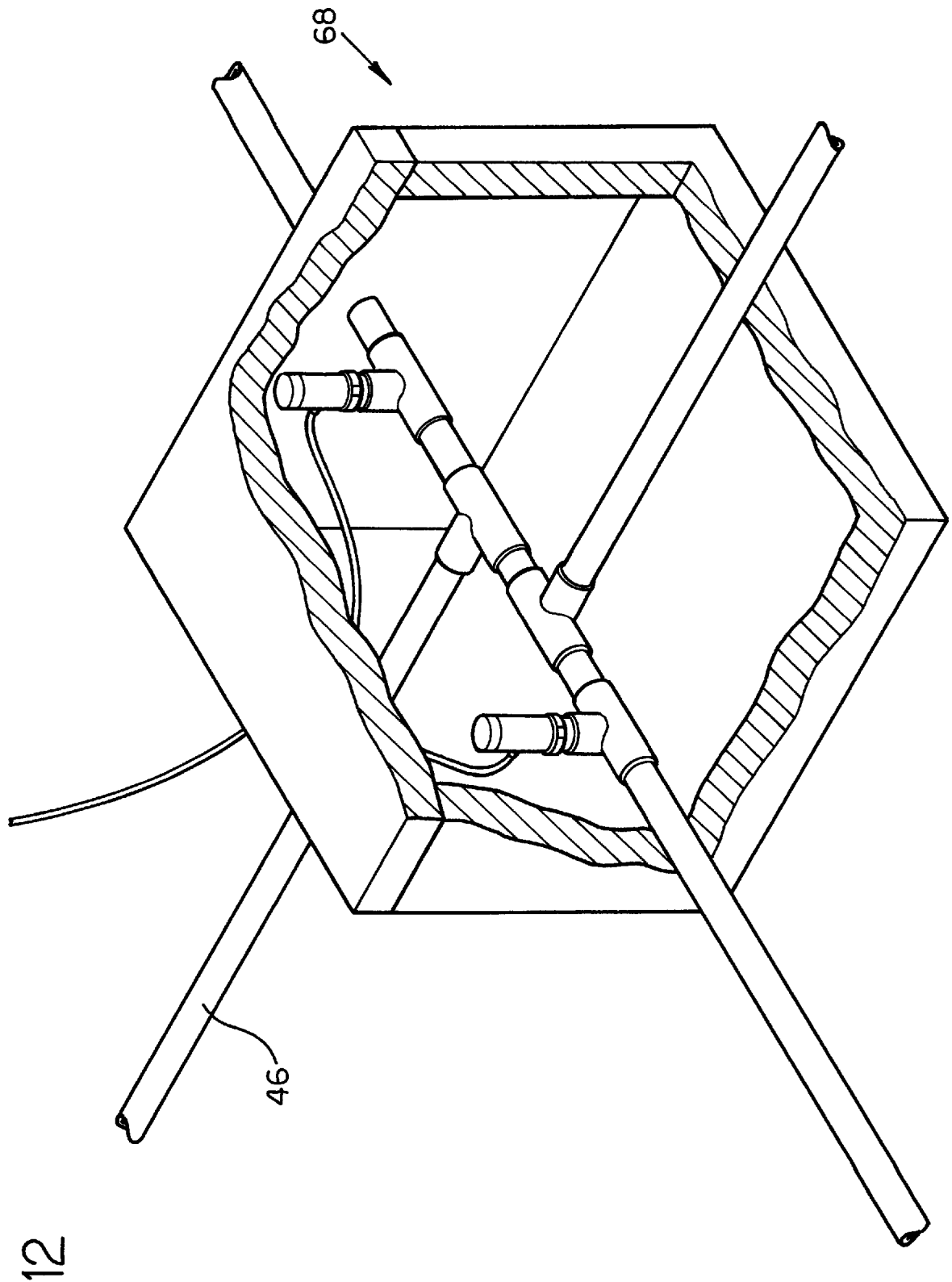
FIG. 12 is a control valve box that houses two solenoid valves for alternating the flow of effluent between two waste water treatment cells.

The alternating distribution system (64) utilized to alternatively transfer the effluent from the septic tank system (36) to one cell (60) or to the other cell (62) can be any conventional valve mechanism as shown in FIG. 12 controlled by a conventional alternating distribution control mechanism (68) to alternatively distribute effluent flow. In one preferred embodiment, this alternating distribution system (64) is the combination of conventional components such as a pair of solenoid valves controlled by conventional timers, magnetic relays and switches in an electrical control panel utilized in combination with other timers, magnetic relays and switches to control the overall system which alternates the flow of effluent between the alternative cells.

After the effluent has remained in one of the cells for a predetermined residence time, in a preferred embodiment as shown in FIG. 6 the dump valve system (50) is opened to allow substantially all of the filtered effluent to pass out of the waste water treatment cell for either further treatment and disposal in lateral fields (48) or for further treatment by recirculation back into the waste water treatment system (10).

Other components of this dual treatment cell system which are above discussed can be utilized with this alternating system, including the utilization of a filter system (44) and a pump (42) within a septic tank (38) as shown in FIG. 5, an effluent discharge tank for filtered effluent and a recirculating pump (56) within the effluent discharge tank (54) as shown in FIG. 11.

The present invention also includes a process for the treatment of effluent from a waste water treatment system. This process includes collecting the effluent from its source in a storage tank, introducing a predetermined quantity of the effluent from the tank into the waste water treatment system (10) above described. This waste water treatment system (10) can utilize a single waste water treatment cell or a plurality of waste water treatment cells, although preferably for best treatment, a pair of cells (60, 62) is utilized. Each of these cells can incorporate any or all of the features of the waste water treatment system (10) that has been above discussed. In particular, the system should cause the effluent to remain in the cell for a residence time that is sufficient for the treatment of the effluent, preferably at least about three hours.

In operation, a waste water treatment system (10) as above described is built into the ground. This waste water treatment system (10) includes a water impervious container (12). Material fill (16) is placed within the container (12) which will include treatment material such as gravel, natural and synthetic materials and plants. Effluent from a conventional source of effluent, such as a residence, passes first into a septic tank (38) and then into a pump tank (40) or only into a septic tank (38), if preferred, where it is then introduced into the waste water treatment system (10) by the effluent introduction system (18). That system then distributes the effluent throughout the system (10) by means of the effluent distribution system (14), preferably a uniform effluent distribution system. This system preferably is a pipe system (28) contained in grooves (26) in the bottom (24) of the container (12). The effluent introduced into the system then passes through the material fill (16) present in the container (12) where it is acted upon anaerobically, aerobically and facilitatedly. After the effluent has had sufficient residence time within the cell, the effluent then passes out of the cell either directly into a distribution system such as a lateral field (48) or, in a preferred embodiment, into an effluent discharge tank (54) where the treated effluent is then recirculated back into the cell for further treatment. In a further preferred embodiment, a pair of waste water treatment system cells (60, 62) are utilized where the effluent is alternately introduced into one of the two cells for a sufficient period of time so that the effluent remains in that cell for a real residence time of at least three hours. Once sufficient treatment has occurred, the treated effluent passes out of the cell, preferably through a dump valve system (50) for passage to a disposal system, such as a lateral field (48), or into the effluent discharge tank (54) for recirculation back into the waste water treatment system (10) for further treatment.

It will be apparent from the foregoing that while particular forms of the invention have been illustrated and described, various modifications can be made without departing from the spirit and scope of the invention. Accordingly, it is not intended that this invention be limited by this disclosure.

We claim:

1. A wastewater treatment system comprising
   (a) a water impervious container,
   (b) material fill placed within the container,
   (c) an effluent introduction system for introducing effluent into the material filled container,
   (d) a generally uniform effluent distribution system for distributing effluent in a generally uniform manner throughout the container, comprising a continuous piping system placed near a bottom of the container, and
   (e) an outflow mechanism, secured to the container, which mechanism permits substantially all of the treated effluent to flow out of the wastewater treatment system during a single wastewater treatment cycle.

2. The waste water treatment system of claim 1 wherein the piping system comprises a single pipe formed into a serpentine pattern.

3. The waste water treatment system of claim 1 wherein the outflow mechanism comprises a dump valve system constructed such that when the dump valve system is opened, substantially all of the treated effluent flows out of the container during a single wastewater treatment cycle.

4. The wastewater treatment system of claim 1 wherein the piping system is preset into grooves in a bottom of the container.

5. The wastewater treatment system of claim 1 further comprising a storage tank for receiving the treated effluent.

6. The wastewater treatment system of claim 5 further comprising a recirculation system for recirculating the treated effluent back into the container.

7. The wastewater treatment system of claim 1 wherein the effluent introduction system comprises a pump located upstream from the container for pumping effluent into the container.

8. The wastewater treatment system of claim 7 further comprising a filter system located upstream from the container for prefiltering the effluent prior to introduction into the container by the pump.

9. A wastewater treatment system comprising
   a water impervious container,
   an effluent distribution system contained within the container,
   material fill, which fill is placed within the container,
   a generally uniform effluent introduction system for introducing effluent into the material filled container comprising a continuous piping system placed near a bottom of the container,
   an outflow mechanism, secured to the container, which mechanism permits treated effluent to flow out of the waste water treatment system, and
   a dump valve system constructed such that when the dump valve system is opened, substantially all of the treated effluent flows out of the container during a single treatment cycle.

10. The wastewater treatment system of claim 9 wherein the effluent distribution system comprises a continuous piping system placed in the container for distributing effluent generally in a uniform manner throughout the container.

11. The wastewater treatment system of claim 10 wherein the piping system comprises a single pipe formed into a serpentine pattern.

12. The wastewater treatment system of claim 9 further comprising a storage tank for receiving the treated effluent.

13. The wastewater treatment system of claim 12 further comprising a recirculating system for recirculating the treated effluent back into the container.

14. The wastewater treatment system of claim 9 wherein the effluent introduction system comprises a pump located upstream from the container for pumping effluent into the container.

15. The wastewater treatment system of claim 14 further comprising a filter system located upstream from the container for prefiltering the effluent prior to introduction into the container by the pump.

16. A wastewater treatment system comprising a plurality of wastewater treatment cells and an alternating distribution system for alternatingly distributing effluent among the wastewater treatment cells, wherein each wastewater treatment cell comprises a water impervious container, an effluent distribution system contained within the container, material fill, which fill is placed within the container, a generally uniform effluent distribution system for introducing effluent into the material filled container in a generally uniform manner throughout the container comprising a continuous piping system placed near a bottom of the container, and an outflow mechanism, secured within the container, which mechanism permits substantially all of the treated effluent to flow out of the waste water treatment cells during a single treatment cycle.

17. The wastewater treatment system of claim 16 wherein the effluent distribution system comprises a uniform effluent distribution system for distributing effluent in a generally uniform manner throughout the container.

18. The wastewater treatment system of claim 17 wherein the uniform effluent distribution system comprises a piping system preset into grooves in a bottom of the container.

19. The wastewater treatment system of claim 18 wherein the piping system comprises a single pipe formed into a serpentine pattern.

20. The wastewater treatment system of claim 16 wherein the alternating distribution system comprises an alternating valve system for distributing substantially all of the effluent from the effluent introduction system into only one of the wastewater treatment cells at a time.

21. The wastewater treatment system of claim 16 wherein the outflow mechanism further comprises a dump valve system constructed such that when the dump valve system is opened, substantially all of the treated effluent flows out of the container during a single treatment cycle.

22. The wastewater treatment system of claim 21 wherein the waste water treatment cells further comprise a storage tank for receiving the treated effluent from the dump valve system.

23. The wastewater treatment system of claim 22 wherein the waste water treatment cells further comprise a recirculation system for recirculating the treated effluent back into the container.

24. The wastewater treatment system of claim 16 further comprising a pump located upstream from the alternating distribution system for pumping effluent into the container.

25. The wastewater treatment system of claim 24 further comprising a filter system located upstream from the alternating distribution system for prefiltering the effluent prior to introduction into the waste water treatment cells.

26. A filtering system for filtering effluent comprising an effluent storage tank and a waste water treatment system wherein the wastewater treatment system comprises a water impervious container, material fill, which fill is placed within the container, a generally uniform effluent distribution system for introducing effluent into the material filled container in a generally uniform manner throughout the container comprising a continuous piping system placed near a bottom of the container, an effluent distribution system for distributing effluent in a generally uniform manner within the container comprising a continuous piping system placed in the container, an outflow mechanism, secured within the container which permits substantially all of the treated effluent introduced into the system to flow out of the wastewater treatment system during a single treatment cycle as treated effluent.

27. The filtering system of claim 26 wherein the piping system is preset into grooves in a bottom of the container.

28. The filtering system of claim 27 wherein the piping system comprises a single pipe formed into a serpentine pattern.

29. The filtering system of claim 26 wherein the outflow mechanism further comprises a dump valve system constructed such that when the dump valve system is opened, substantially all of the treated effluent flows out of the container during a single treatment cycle.

30. The filtering system of claim 26 wherein the waste water treatment system further comprises a storage tank for receiving the treated effluent.

31. The filtering system of claim 30 wherein the waste water treatment system further comprises a recirculation system for recirculating the treated effluent back into the container.

32. The filtering system of claim 26 wherein the effluent storage tank is a septic tank system.

33. A filtering system for filtering an effluent comprising an effluent storage tank and a wastewater treatment system wherein the wastewater treatment system comprises a water impervious container a uniform effluent distribution system comprising a continuous piping system placed near a bottom of the container, material fill, which fill is placed within the container, an effluent introduction system for introducing effluent into the material fill container, an outflow mechanism, secured within the container, which mechanism permits substantially all of the treated effluent to flow out of the wastewater treatment system as treated effluent, and a dump valve system constructed such that when the dump valve is opened, substantially all of the treated effluent flows out of the container during a single treatment cycle.

34. The filtering system of claim 33 wherein the effluent distribution system comprises a piping system preset into grooves in a bottom of the container.

35. The filtering system of claim 33 wherein the piping system comprises a single piping system formed into a serpentine pattern.

36. The filtering system of claim 33 wherein the waste water treatment system further comprises a storage tank for receiving treated effluent.

37. The filtering system of claim 36 wherein the waste water treatment system further comprises a recirculation system for recirculating the treated effluent back into the container.

38. The filtering system of claim 33 wherein the effluent introduction system comprises a pump located upstream from the container for pumping effluent into the container.

39. The filtering system of claim 38 further comprising a filter system located upstream from the container for prefiltering the effluent prior to introduction into the container.

40. The filtering system of claim 33 wherein the effluent storage tank is a septic tank system.

41. A process for treating effluent comprising collecting the effluent in a tank, introducing a predetermined quantity of effluent from the tank into a waste water treatment system, wherein the waste water treatment system comprises a water impervious container, an effluent introduction system for introducing effluent into the material filled container, an effluent distribution system contained within the container comprising a continuous piping system placed near a bottom of the container, material fill, which fill is placed within the container, and an outflow mechanism which permits substantially all of the treated effluent to flow out of the treatment system during a single treatment cycle.

42. The process of claim 41 further comprising maintaining the effluent within the constructed wastewater treatment system for at least about four hours.

43. The process of claim 41 further comprising removing the treated effluent from the constructed wastewater treatment system cell into a tank.

44. The process of claim 43 further comprising reintroducing the treated effluent from the tank into the constructed wetland system.

45. The process of claim 41 further comprising dumping substantially all of the treated effluent in the waste water treatment system out of the system.

* * * * *